US006188998B1

(12) United States Patent
Cuce' et al.

(10) Patent No.: US 6,188,998 B1
(45) Date of Patent: Feb. 13, 2001

(54) METHOD AND APPARATUS FOR STORING ONE OR MORE NATURAL MEMBERSHIP FUNCTIONS

(75) Inventors: Antonino Cuce', Messina; Matteo Lo Presti, Misterbianco, both of (IT)

(73) Assignees: SGS-Thomson Microelectronics S.r.l., Agrate Brianza; Consorzio per la Ricerca sulla Microelettronica nel Mezzogiorno, Catania, both of (IT)

( * ) Notice: Under 35 U.S.C. 154(b), the term of this patent shall be extended for 0 days.

(21) Appl. No.: 08/806,781

(22) Filed: Feb. 26, 1997

(30) Foreign Application Priority Data

Feb. 29, 1996 (EP) .................................................. 96830090

(51) Int. Cl.[7] ...................................................... G06N 7/02
(52) U.S. Cl. .......................... 706/7; 706/8; 706/1; 706/3
(58) Field of Search ............................................. 706/3, 1

(56) References Cited

U.S. PATENT DOCUMENTS

| 5,295,226 | * | 3/1994 | Yamakawa ................................. 706/3 |
| 5,343,553 | | 8/1994 | Miyazawa et al. ....................... 395/3 |
| 5,710,867 | * | 1/1998 | Giacalone et al. ....................... 706/1 |

FOREIGN PATENT DOCUMENTS

| 0 471 843 | 2/1992 | (EP) ................................. G06F/9/44 |
| 0 488 883 | 6/1992 | (EP) ............................. G05D/13/00 |
| 0 636 967 | 2/1995 | (EP) ................................. G06F/7/60 |

OTHER PUBLICATIONS

European Search Report from European Patent Application 96830090.5. filed Feb. 29, 1996.
Microprocessors and Microsystems, vol. 18, No. 7, Sep. 1, 1994, pp. 409–420, "Fuzzy Logic and the Neuron Chip".
Kaufmann, A., and Gupta, M.M.: "Introduction to Fuzzy Arithmetic," Van Nostrand Reinhold, New York, pp. 80–81, 10–13, 68–70, Jan. 1991.*
Zadeh, L.: "Fuzzy Logic," Computer Magazine, vol. 21, pp. 83–93, Apr. 1988.*
Dubois, D., Prade H.: "What are Fuzzy Rules and How to Use Them," Fuzzy Sets and Systems, vol. 84, pp. 169–185, Feb. 1996.*

* cited by examiner

Primary Examiner—Tariq R. Hafiz
Assistant Examiner—Wilbert L. Starks, Jr.
(74) Attorney, Agent, or Firm—Wolf, Greenfield & Sacks, P.C.; James H. Morris; Theodore E. Galanthay

(57) ABSTRACT

In a method, according to the invention, of storing one or more natural membership functions of respectively one or more natural variables being each defined within a natural universe of discourse having a lowest natural value and a highest natural value, the natural membership functions are normalized through respective normalization coefficients so that they are defined within the same predetermined absolute universe of discourse having a lowest absolute value and a highest absolute value, thereby obtaining one or more absolute membership functions, respectively, and said absolute membership functions and said normalization coefficients are stored, taking account that identical absolute membership functions are stored only once.

13 Claims, 3 Drawing Sheets

METHOD AND APPARATUS FOR STORING ONE OR MORE NATURAL MEMBERSHIP FUNCTIONS

BACKGROUND OF THE INVENTION

1. Field of the Invention

This invention relates to fuzzy logic, and more particularly to methods for storing membership functions, as well as processors of the fuzzy type for implementing the method.

2. Discussion of the Related Art

A survey of both theoretical and practical aspects of fuzzy logic processing is to be found in M. M. Gupta and T. Yamakawa, "FUZZY COMPUTING", North-Holland, 1988.

One of the most critical aspects in the design of architectures for fuzzy logic processing is he representation of the linguistic terms that collectively form the so-called dictionary of terms, which is in practice the equivalent of representing the functions of membership to such terms.

The techniques for representing membership functions can be divided into two general classes: those which take no account of the function shape, and usually provide for function sampling, and those which only apply to particular shapes, such as triangular, trapezoidal, and other shapes of the functions.

Some methods of storing membership functions from the former class are described in Patent Applications EP 628 902 and EP 628 903, wherein only the respective non-null samples of each function are stored.

A method of storing membership functions from the latter class is described in Patent Application EP 675 431, wherein an apex and the slopes on the left-hand and right-hand sides of the apex are stored for each function. A circuit for computing such functions, starting from their storing in the manner outlined above, is described in Patent Application EP 675 430.

It will be appreciated from the foregoing concise review of prior methods that considerable work has been devoted to minimizing the storage capacity requirements for each individual membership function.

SUMMARY OF THE INVENTION

An object of the present invention is to minimize the amount of storage capacity required to store a whole set of membership functions, namely all those required to implement a fuzzy type of control.

An embodiment of the invention is directed to a method for storing, in a fuzzy type of processor, one or more natural membership functions that respectively correspond to one or more natural variables, each natural variable being defined within a respective natural universe of discourse having a respective lowest natural value and a respective highest natural value. The method includes the steps of (a) obtaining one or more absolute membership functions by normalizing the one or more natural membership functions through respective normalization coefficients such that the one or more natural membership functions are defined within a same predetermined absolute universe of discourse having a lowest absolute value and a highest absolute value, and (b) storing the one or more absolute membership functions and the normalization coefficients in the processor such that identical absolute membership functions are stored only once.

Another embodiment of the invention is directed to an apparatus for storing membership functions. The apparatus includes a storage circuit for storing membership functions defined within a same predetermined universe of discourse, the storage circuit being arranged not to store information about universes of discourse.

Another embodiment of the invention is directed to a fuzzy type of processor, including a processor input for inputting a plurality of natural variables; a processor output for outputting at least one control parameter; a fuzzyfier unit having an input and an output; a rule computation unit having an input coupled to the output of the fuzzyfier unit, and an output; a defuzzyfier unit having an input coupled to the output of the rule computation unit, and an output coupled to the processor output; and a normalization unit having an input coupled to the processor input, and an output coupled to the input of the fuzzyfier unit.

Another embodiment of the invention is directed to a fuzzy type of processor, including a processor input for inputting a plurality of natural variables; a processor output for outputting at least one control parameter; a fuzzyfier unit including a storage circuit for storing membership functions defined within a same predetermined universe of discourse, an input coupled to the processor input, and an output, wherein the storage circuit is arranged not to store information about universes of discourse; a rule computation unit having an input coupled to the output of the fuzzyfier unit, and an output; and a defuzzyfier unit having an input coupled to the output of the rule computation unit, and an output coupled to the processor output.

An embodiment of the present invention utilizes, for the purpose of fuzzy logic processing, a "dictionary of absolute terms", i.e. of terms having the same universe of discourse and on this account referred to as being "absolute". In this way, redundancies, that appear each time that complex fuzzy controls are implemented, can be eliminated.

Of course, this requires normalization of the natural variables to be processed. The last-named operation can be carried out either within the fuzzy processor itself, or upstream of its inputs for the natural variables by means of specialized hardware.

BRIEF DESCRIPTION OF THE DRAWINGS

The foregoing and other objects, features, aspects and advantages of the invention will become apparent from the following detailed description of the present invention when taken in conjunction with the accompanying drawings, in which.

DETAILED DESCRIPTION

Fuzzy logic processing acts on natural input variables, generally denoted by X-i, which represent the values of natural physical quantities, such as temperature, pressure, speed, etc.

For each input variable X-i, a set of terms are usually defined, and for each term a membership function, generally denoted by MF-k and referred to as "natural" hereinafter, is defined which allows the degree of membership to the term for each value of the variable X-i to be known. Each natural variable X-i is defined within a universe of discourse, UD-i, which will be referred to as "natural" and has a lowest natural value LL-i and a highest natural value HL-i. All those natural membership functions which refer to the same natural variable will be defined within the same natural universe of discourse associated with that variable, whereas those membership functions which refer to different variables will usually be defined within different universes of discourse. Finally, membership functions can only take values in the 0 to 1 range.

Figure 1:
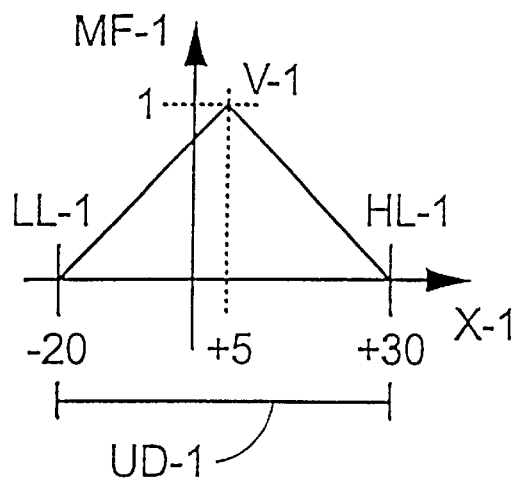
FIG. 1 illustrates a first natural membership function.

Shown, by way of example in FIG. 1, is a first natural membership function MF-1 associated with a natural variable X-1 defined within a natural universe UD-1 of discourse having a lowest natural value LL-1 of −20, and a highest natural value HL-1 of +30. The function MF-1 has the shape of an isosceles triangle with a base coincident with the universe UD-1 and, therefore, an apex V-1 whose abscissa is +5 in the example.

Figure 2:
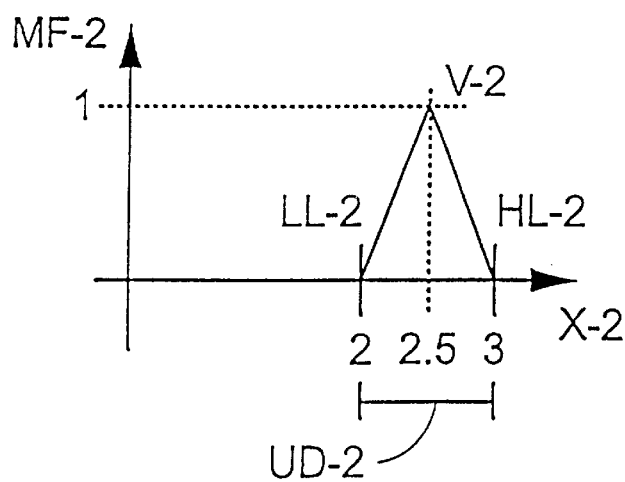
FIG. 2 illustrates a second natural membership function.

FIG. 2 shows, by way of example, a second natural membership function MF-2 associated with a natural variable X-2 defined within a natural universe UD-2 of discourse whose lowest natural value LL-2 is equal to 2, and whose highest natural value HL-2 is equal to 3. The function MF-2 has the shape of an isosceles triangle whose base is coincident with the universe UD-2, whereby its apex V-2 has an abscissa value of 2.5, in the example.

Figure 3:
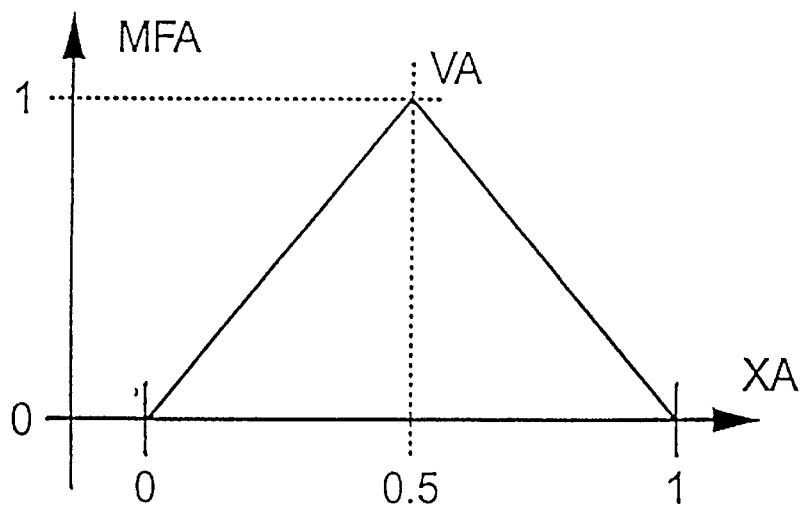
FIG. 3 illustrates an absolute membership function obtained by normalizing the functions of FIGS. 1 and 2.

The two functions MF-1 and MF-2 can be normalized such that they are defined within the same predetermined absolute universe UDA of discourse having a lowest absolute value LLA and a highest absolute value HLA. These functions, while being quite different to each other, originate from the same absolute membership function MFA, as shown in FIG. 3, because they are similar in shape. In the example of FIG. 3, the universe UDA corresponds to the 0 to 1 range, and the function MFA has the shape of an isosceles triangle having its base coincident with the universe UDA and, therefore, an apex VA whose abscissa value is 0.5, in the example.

The normalization has only been applied to the abscissae of the functions MF-k, i.e., to the universes UD-i since, in the respect of the ordinates, the functions MF-k have already been normalized in the 0–1 range. For the function MF-1, a subtraction of —20 and a division by 50 have been performed; for the function MF-2, a subtraction of 2 and a division by 1 have been performed.

Figure 4:
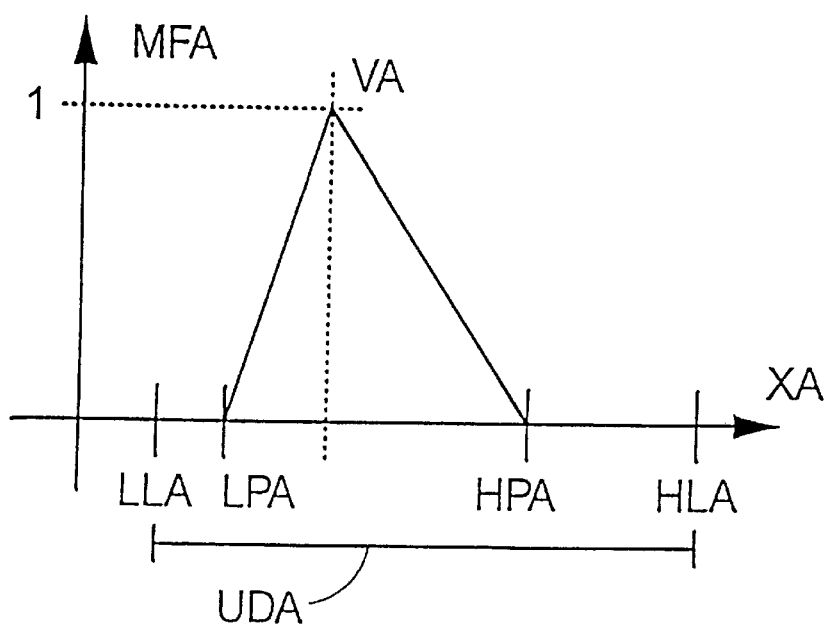
FIG. 4 illustrates a generic absolute membership function.

Thus, the normalization of a universe UD-i is defined on the basis of normalization coefficients NC-i, which, in this example, are 20, 50, 2 and 1, Shown in FIG. 4 is a generic absolute membership function MFA of triangular shape which is defined within an absolute universe UDA of discourse having a lowest absolute value LLA and a highest absolute value HLA, wherein the triangle, and hence the function MFA, has a left foot LPA, a right foot HPA, and an apex VA; the foot LPA and apex VA define the left side of the triangle, while the foot HPA and apex VA define the right side of the triangle.

On the grounds of the foregoing considerations, the natural membership functions MF-k can, by a normalization operation, be converted to absolute membership functions MFA which will usually be a much smaller number. In fuzzy logic control situations, it is frequent for several terms to be associated with membership functions of like shape, i.e., functions that have the same shape after being normalized. Furthermore, it is often possible to bring slightly different absolute membership functions to coincide with minimum control error.

Figure 5:
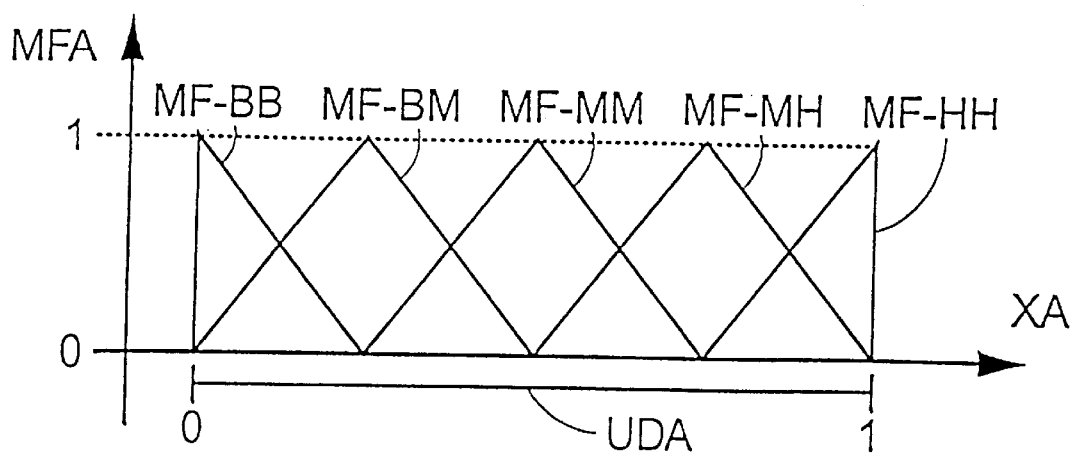
FIG. 5 illustrates a set of five absolute membership functions relating to the same absolute variable for five different absolute terms.

The "dictionary of absolute terms" is defined by means of a set of absolute membership functions MFA. An example of such a dictionary is given in FIG. 5, where a set of five absolute membership functions are shown at MF-BB, MF-BM, MF-MM, MF-MH and MF-HH, each membership function having a triangular shape and relating to the same absolute variable XA for five different absolute terms, namely BB "low", BM "medium-to-low", MM "medium", MH "medium-to-high" and HH "high".

To calculate the value of a natural membership function MF-k corresponding to the value of a natural variable X-i based on the absolute membership function MFA as obtained by normalization thereof, it is necessary that the natural variable X-i be normalized likewise.

According to an embodiment of the invention, storing a set of natural membership functions MF-k is achieved by storing by the absolute membership functions MFA and the normalization coefficients NC-i. This can be achieved by storing identical absolute functions MFA only once, of course.

In the interest of a simple computation of the natural membership functions MF-k, it is of advantage that normalization coefficients NC-i corresponding to the lowest natural value LL-i and to the reciprocal of the difference between the highest natural value HL-i and the lowest natural value LL-i be stored for each natural variable X-i. In fact, to carry out a normalization operation on a value of a natural variable X-i, it will be sufficient to perform a difference, a product, and possibly two memory accesses, which implies that the universe UDA corresponds to the 0–1 range. Of course, there are other ways of carrying out the normalization based on other coefficients NC-i.

Regarding the absolute membership functions MFA, the absolute universe UDA of discourse, which would be the same for all of them, may be selected in any arbitrary manner; the most simple and advantageous choice for the absolute universe UDA of discourse for computing purposes would correspond to the 0–1 range.

Therefore, the storing of absolute functions MFA involves no storing of any information pertaining to universes of discourse.

Where the storing is limited to membership functions of triangular shape, these will take up but a very small amount of storage capacity and their computation can be effected in a very simple manner.

In a first example, storing the absolute functions MFA includes storing their left foot LPA, right foot HPA, and apex VA, i.e., three data values for each absolute function MFA.

In this example, the computation to obtain, as the result RIS, the value of the absolute membership function advantageously corresponds to the two following compound operations, carried out sequentially:

| | | |
|---|---|---|
| IF NX-i < VA | THEN | TEMP = (NX-i − LPA)/(VA − LPA) |
| | OTHERWISE | TEMP = (NX-i − HPA)/(VA − HPA); |
| IF TEMP < 0 | THEN | RIS = 0 |
| | OTHERWISE | RIS = TEMP; | where, NX-i is the value of the normalized variable X-i. Accordingly, two compare operations, two difference operations, and one division operation are required.

In a second example, storing the absolute functions MFA includes storing their apex VA, left foot LPA, right foot HPA, the reciprocal R1 of the difference between their apex VA and left foot LPA, and the reciprocal R2 of the difference between their apex VA and right foot HPA; that is, storing five data values for each absolute function MFA.

In this example, the computation to obtain, as the result RIS, the value of the absolute membership function advantageously corresponds to the two following compound operations, carried out sequentially:

| IF NX-i < VA | THEN | TEMP = (NX-i = LPA)*R1 |
|---|---|---|
|  | OTHERWISE | TEMP = (NX-I − HPA)*R2; |
| IF TEMP < 0 | THEN | RIS = 0 |
|  | OTHERWISE | RIS = TEMP. |

Accordingly, two compare operations, a difference operation, and a product operation are required.

In a third example, storing the absolute functions MFA includes storing their apex VA, the reciprocal R1 of the difference between their apex VA and left foot LPA, and the reciprocal R2 of the difference between their apex VA and right foot HPA; that is, three data values for each absolute function MFA.

In this example, the computation for obtaining, as the result RIS, the value of the absolute membership function advantageously corresponds to the following compound operations, carried out sequentially:

| IF NX-i < VA | THEN | TEMP1 = (VA − NX-i)*R1 |
|---|---|---|
|  | OTHERWISE | TEMP2 = (VA = NX-i)*R2; |
| TEMP2 = 1 − TEMP1; |  |  |
| IF TEMP2 < 0 | THEN | RIS = 0 |
|  | OTHERWISE | RIS = TEMP2. |

Accordingly, two compare operations, a difference operation, an operation of one's complement, and a product operation are required. It should be noted that the one's complement operation on binary words, composed of binary digits corresponding to negative powers of two, corresponds to a logic NOT operation carried out on the individual binary digits and is, therefore, much easier to implement circuit-wise and much faster.

Of the three examples given hereinabove, the first and third examples are the most advantageous from the standpoint of memory occupation. In the third example, the computation is uniquely simple.

The present invention also concerns a circuit or unit for computing the membership functions. This unit, which is called the "fuzzyfier unit", is shown, in a schematic manner in FIG. 6, within a processor of the fuzzy type and is denoted by FU.

The unit FU includes a membership function computation circuit MFP proper and a storage circuit MFM for the membership functions defined within one and the same predetermined universe of discourse, as arranged not to store information about universes of discourse. In fact, this would be unnecessary if the universe of discourse is a single universe, and especially if it corresponds to the 0–1 range. This is quite different to what is sometimes the case, namely that information about membership functions defined within different natural universes of discourse is stored into different memory areas, or that information concerning membership functions which relate to different natural variables and are, therefore, defined within different natural universes of discourse, is stored into different memory areas.

Where the storage circuit MFM is effective to only store membership functions of triangular shape, storage capacity must be provided in it for, in the best of cases, three data values only per function, these data values being the apex and the two feet, or functions thereof, as explained above.

Figure 7:
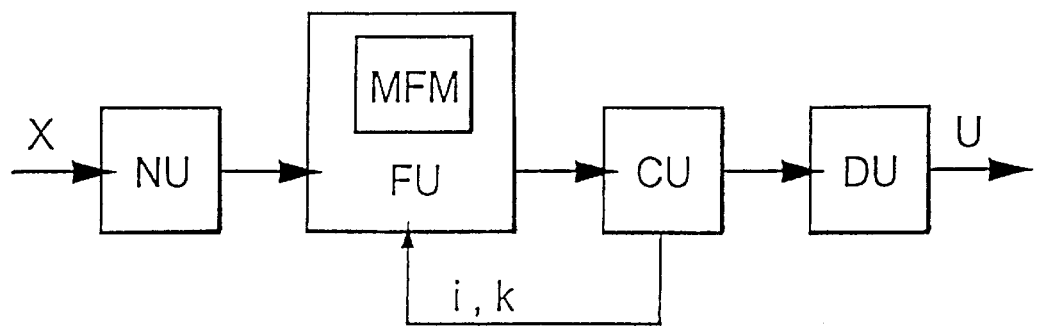
FIG. 7 shows a block diagram for a processor of the fuzzy type according to an embodiment of the present invention.

Finally, the present invention is directed to a fuzzy type of processor, as shown in FIG. 7. The processor has an input X for a plurality of natural variables X-i and an output U for at least one control parameter, more frequently a plurality of parameters. The processor comprises a fuzzyfier unit FU, and is usually provided with a membership function storage circuit MFM coupled to the input X, a rule computation unit CU coupled to the output of the fuzzyfier unit FU, and a defuzzyfier unit DU coupled to the output of the computation unit CU and the output U. As is known, the number of the input/output lines that make up the various inputs and outputs of the various units is a parameter which is set as a compromise of the space required to implement them and the overall operating speed of the processor.

Processors of this kind are available commercially. One such example is a device called W.A.R.P. manufactured by SGS-THOMSON MICROELECTRONICS. The inputs and outputs of such processors may be of the digital or the analog type: purely analog processors are much faster but their storage circuit MFM is more complicated, being precision analog memories.

In addition, possible schemes for implementing the circuit units FU, CU, DU have been repeatedly proposed in patents and patent applications, e.g. in European Patent Applications Nos. 628902, 628903, 675430, 675431, 684549 and 684550.

The fuzzy processor of this invention is based on the use of a dictionary of absolute terms.

To this aim, the processor may include a normalization unit NU coupled between the input X and the input of the fuzzyfier unit.

Alternatively, when the signals to the input X are already normalized, by their own nature or by specialized hardware external of the processor, it will suffice that the circuit MFM be arranged to store information about membership functions defined within the same predetermined universe of discourse (most advantageously, the 0–1 range), and not to store information about universes of discourse.

When the storage circuit MFM is effective to only store triangle-shaped membership functions, storage capacity must be provided in it for, in the best of cases, three data values only per function, which data would be the apex and the two feet, or functions thereof.

The processor including both the normalization unit NU and a suitable storage circuit MFM is advantageously adapted to be arranged for implementing the foregoing method of this invention.

Figure 6:
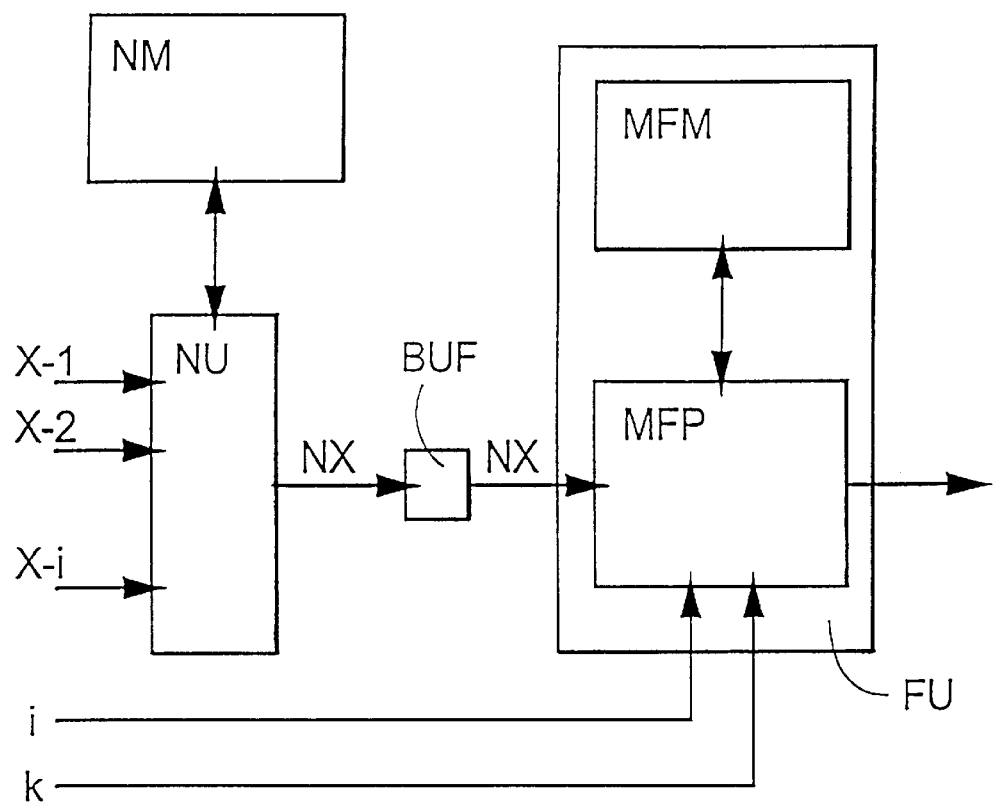
FIG. 6 shows a block diagram for a fuzzyfier unit according to an embodiment of the present invention.

Referring to FIG. 6, an embodiment of the assembly formed of the normalization unit NU and the fuzzyfier unit FU will be described in detail.

The unit NU is connected to "i" input lines for corresponding natural variables X-i and operates to normalize them by reading the coefficients NC-i from a normalization memory NM and applying the foregoing formula. The computation may be performed in parallel or sequentially, for all the natural variables X-i.

Available at the normalization unit NU output are the normalized variables. The output may be of the serial type, i.e., comprised of a single line only, or of the parallel type, i.e., comprised of a plurality of lines; that is, the values of the normalized variables NX-i can be output either sequentially or simultaneously.

The output of the unit NU is connected to the input of a buffer storage unit BUF which stores the normalized values such that the unit FU can use them several times to compute different membership functions without having to compute them again each time.

In the example of FIG. 6, the unit BUF is advantageously provided with a number of input/output lines equal to the number "i" of the natural variables; in this way, the circuit can be made faster and simpler.

The unit FU is connected to the outputs of the unit BUF and is further input two signals "i" and "k". The signal "i" indicates to the unit FU on which normalized variable NX-i it should operate. The signal "k" indicates to the unit FU which absolute function MFA-k requires computing.

The unit FU comprises a computation circuit MFP and a storage circuit MFM connected to the former for reading the data relating to the absolute membership functions MFA. The circuit MFM is arranged for storing such data; the circuit MFP is arranged for applying the foregoing formulae.

The output of the unit FU is connected to the input of the unit CU for computing the fuzzy rules. This unit processes the fuzzy rules on the basis of the degrees of membership to the terms of the natural variables X-i. For this purpose, when requiring a particular degree of membership, it supplies the unit FU with a value of "i" corresponding to the index of the natural variable X-i concerned and a value of "k" corresponding to the index of the absolute membership function MFA-k concerned.

The output of the unit CU is connected to the input of the defuzzyfier unit DU. The defuzzyfier unit DU combines the results of the computations for the various rules and outputs an electric signal corresponding to a control parameter whose value is suitably tied to the processing of interest.

Having thus described several particular embodiments of the invention, various alterations, modifications, and improvements will readily occur to those skilled in the art. Such alterations, modifications, and improvements as are made obvious by this disclosure are intended to be part of this disclosure though not expressly stated herein, and are intended to be within the spirit and scope of the invention. Accordingly, the foregoing description is by way of example only and is not intended to be limiting. The invention is limited only as defined in the following claims and equivalents thereto.

What is claimed is:

1. A fuzzy type of processor, comprising:
   a processor input for inputting a plurality of natural variables;
   a processor output for outputting at least one control parameter;
   a fuzzyfier unit having an input and an output;
   a rule computation unit having an input coupled to the output of the fuzzyfier unit, and an output;
   a defuzzyfier unit having an input coupled to the output of the rule computation unit, and an output coupled to the processor output; and
   a normalization unit having an input coupled to the processor input, and an output coupled to the input of the fuzzyfier unit.

2. The processor of claim 1, further comprising:
   a buffer storage unit coupled between the output of the normalization unit and the input of the fuzzyfier unit, the buffer storage unit being adapted to store normalized values of the plurality of natural variables.

3. A fuzzy type of processor, comprising:
   a processor input for inputting a plurality of natural variables, each natural variable being defined within a respective natural universe of discourse having a respective lowest natural value and a respective highest natural value;
   a processor output for outputting at least one control parameter;
   a fuzzyfier unit having an input and an output, wherein the fuzzyfier unit further includes means for storing one or more natural membership functions that respectively correspond to the plurality of natural variables, the means for storing including:
      means for obtaining one or more absolute membership functions by normalizing the one or more natural membership functions through respective normalization coefficients such that the one or more natural membership functions are defined within a same predetermined absolute universe of discourse having a lowest absolute value and a highest absolute value, and
      means for storing the one or more absolute membership functions and the normalization coefficients in the fuzzyfier unit such that identical absolute membership functions are stored only once;
   a rule computation unit having an input coupled to the output of the fuzzyfier unit, and an output;
   a defuzzyfier unit having an input coupled to the output of the rule computation unit, and an output coupled to the processor output; and
   a normalization unit having an input coupled to the processor input, and an output coupled to the input of the fuzzyfier unit.

4. A fuzzy type of processor, comprising:
   a processor input for inputting a plurality of natural variables, each natural variable being defined within a respective natural universe of discourse having a respective lowest natural value and a respective highest natural value;
   a processor output for outputting at least one control parameter;
   a fuzzyfier unit including a storage circuit for storing membership functions defined within a same predetermined universe of discourse, an input coupled to the processor input, and an output, wherein the storage circuit is arranged not to store information about universes of discourse, the fuzzyfier unit further including means for storing one or more natural membership functions that respectively correspond to the plurality of natural variables, the means for storing including:
      means for obtaining one or more absolute membership functions by normalizing the one or more natural membership functions through respective normalization coefficients such that the one or more natural membership functions are defined within a same predetermined absolute universe of discourse having a lowest absolute value and a highest absolute value, and
      means for storing the one or more absolute membership functions and the normalization coefficients in the processor such that identical absolute membership functions are stored only once; a rule computation unit having an input coupled to the output of the fuzzyfier unit, and an output; and
   a defuzzyfier unit having an input coupled to the output of the rule computation unit, and an output coupled to the processor output.

5. A method for storing a plurality of natural membership functions in a fuzzy logic device, the method comprising the steps of:

generating a plurality of normalized membership functions, and a plurality of normalization coefficients that respectively correspond to the plurality of normalized membership coefficients, to represent the plurality of natural membership functions, and storing in the fuzzy logic device, for each of the plurality of natural membership functions, a generated normalized membership function and generated normalization coefficients when the normalized membership function is not stored already in the fuzzy logic device, and only the generated normalization coefficients when the normalized membership function is stored already in the fuzzy logic device.

6. The method of claim 5, wherein a first natural membership function is a triangle; wherein the step of generating includes determining an apex, a left foot, and a right foot, of the triangle; and wherein the step of storing includes storing in the fuzzy logic circuit the determined apex, the determined left foot, and the determined right foot, as the normalization coefficients for the first natural membership function.

7. The method of claim 5, wherein a first natural membership function is a triangle; wherein the step of generating includes determining an apex, a left foot, and a right foot, of the triangle, and determining a first reciprocal of a first difference between the apex and the left foot, and a second reciprocal of a second difference between the apex and the right foot; and wherein the step of storing includes storing in the fuzzy logic circuit the determined apex, the determined first reciprocal, and the determined second reciprocal, as the normalization coefficients for the first natural membership function.

8. An apparatus for storing a plurality of natural membership functions in a fuzzy logic device, the apparatus comprising:

means for generating a plurality of normalized membership functions, and a plurality of normalization coefficients that respectively correspond to the plurality of normalized membership coefficients, to represent the plurality of natural membership functions, and storing means for storing in the fuzzy logic device, for each of the plurality of natural membership functions, a generated normalized membership function and generated normalization coefficients when the normalized membership function is not stored already in the fuzzy logic device, and only the generated normalization coefficients when the normalized membership function is stored already in the fuzzy logic device.

9. The apparatus of claim 8, wherein a first natural membership function is a triangle; herein the means for generating includes means for determining an apex, a left foot, and a right foot, of the triangle; and wherein the storing means includes means for storing in the fuzzy logic circuit the determined apex, the determined left foot, and the determined right foot, as the normalization coefficients for the first natural membership function.

10. The apparatus of claim 8, wherein a first natural membership function is a triangle; wherein the means for generating includes means for determining an apex, a left foot, and a right foot, of the triangle, and means for determining a first reciprocal of a first difference between the apex and the left foot, and a second reciprocal of a second difference between the apex and the right foot; and wherein the storing means includes means for storing in the fuzzy logic circuit the determined apex, the determined first reciprocal, and the determined second reciprocal, as the normalization coefficients for the first natural membership function.

11. An apparatus for storing a plurality of natural membership functions in a fuzzy logic device, the apparatus comprising:

a generating circuit having an output that provides a generated plurality of normalized membership functions, and a generated plurality of normalization coefficients that respectively correspond to the plurality of normalized membership coefficients, to represent the plurality of natural membership functions, and a storing circuit having an input coupled to the output of the generating circuit, and an output that couples to the fuzzy logic device, wherein the storing circuit stores in fuzzy logic device, for each of the plurality of natural membership functions, a generated normalized membership function and generated normalization coefficients when the normalized membership function is not stored already in the fuzzy logic device, and only the generated normalization coefficients when the normalized membership function is stored already in the fuzzy logic device.

12. The apparatus of claim 11, wherein a first natural membership function is a triangle; wherein the generating circuit includes a processing circuit that determines an apex, a left foot, and a right foot, of the triangle; and wherein the storing circuit includes circuitry that stores in the fuzzy logic circuit the determined apex, the determined left foot, and the determined right foot, as the normalization coefficients for the first natural membership function.

13. The apparatus of claim 11, wherein a first natural membership function is a triangle; wherein the generating circuit includes a processing circuit that determines an apex, a left foot, and a right foot, of the triangle, and determines a first reciprocal of a first difference between the apex and the left foot, and a second reciprocal of a second difference between the apex and the right foot; and wherein the storing circuit includes circuitry that stores in the fuzzy logic circuit the determined apex, the determined first reciprocal, and the determined second reciprocal, as the normalization coefficients for the first natural membership function.

* * * * *